United States Patent
D'Ercoli et al.

(10) Patent No.: US 10,325,130 B2
(45) Date of Patent: Jun. 18, 2019

(54) PREDICTIVE ANOMALY DETECTION

(71) Applicant: DATALOGIC IP TECH S.R.L., Monte San Pietro, Bologna (IT)

(72) Inventors: Francesco D'Ercoli, Bologna (IT); Simone Cilli, Bologna (IT)

(73) Assignee: Datalogic IP Tech S.r.l., Lippo di Calderara di (IT)

(*) Notice: Subject to any disclaimer, the term of this patent is extended or adjusted under 35 U.S.C. 154(b) by 70 days.

(21) Appl. No.: 15/370,709

(22) Filed: Dec. 6, 2016

(65) Prior Publication Data

US 2018/0157888 A1 Jun. 7, 2018

(51) Int. Cl.
*G06K 9/00* (2006.01)
*G06K 7/14* (2006.01)
*G06K 19/06* (2006.01)
*G06K 7/10* (2006.01)

(52) U.S. Cl.
CPC ............. *G06K 7/1491* (2013.01); *G06K 7/10* (2013.01); *G06K 7/10881* (2013.01); *G06K 7/14* (2013.01); *G06K 7/1413* (2013.01); *G06K 19/06028* (2013.01)

(58) Field of Classification Search
CPC .............................. G06K 7/1491; G06K 7/146
USPC ..................... 235/462.12, 462.15, 462.25
See application file for complete search history.

(56) References Cited

U.S. PATENT DOCUMENTS

| | | | |
|---|---|---|---|
| 5,837,983 A | 11/1998 | Actis et al. | |
| 6,050,731 A | 4/2000 | Matsui | |
| 6,363,484 B1 * | 3/2002 | Cordery | G06K 9/723 713/155 |
| 6,857,567 B2 * | 2/2005 | Latimer | G06K 7/10861 235/380 |
| 7,347,376 B1 * | 3/2008 | Biss | B41F 33/0036 235/455 |

(Continued)

FOREIGN PATENT DOCUMENTS

WO   2005124657 A1   12/2005

OTHER PUBLICATIONS

Research on Data Mining Models for the Internet of Things; Shen Bin, Liu Yuan, Wang Xiaoyi; Ningbo Institute of Technology, Zhejiang University, Ningbo, China; College of Management, Zhejiang University, Hangzhou, China.

(Continued)

*Primary Examiner* — Daniel St Cyr
(74) *Attorney, Agent, or Firm* — Shook, Hardy & Bacon, L.L.P.

(57) ABSTRACT

Systems, methods, and computer-readable storage media are provided for an embedded, scalable, predictive tool capable of detecting in-field anomalies and trends in advance of productivity losses on single devices, device clusters, and/or multi-cluster architectures. In-field and in real-time, sets of barcode signal sequences associated with respective barcode symbols are collected in time series (that is, at successive time intervals). A quality index measure in computed for each of the barcode signal sequence sets such that each quality index measure is associated with a barcode symbol. Patterns among the sets are identified therefrom and compared to barcode symbol patterns that are known to be associated with particular trends or anomalies and appropriately classified as such.

27 Claims, 10 Drawing Sheets

(56) References Cited

U.S. PATENT DOCUMENTS

| 8,939,368 B2* | 1/2015 | Reed ................. G06K 7/10881 |
| | | 235/437 |
| 2002/0102966 A1 | 8/2002 | Lev et al. |
| 2002/0190127 A1 | 12/2002 | Davis et al. |
| 2013/0256409 A1 | 10/2013 | Reed et al. |

OTHER PUBLICATIONS

From Data Mining to Knowledge Discovery in Databases; Usama Fayyad, Gregory Piatetsky-Shapiro, Padhraic Smyth; AI Magazine, vol. 17, No. 3, Fall 1996.
Pattern Recognition in Time Series; Jessica Lin, Sheri Williamson, Kirk Borne; George Mason University; David DeBarr; Microsoft Corporation.
Time Series Data Mining Methods: A Review (Master Thesis); Caroline Kleist; Humbolt-University in Berlin; School of Business and Economics; Mar. 25, 2015.
Decision Trees are Well-Known Prior-Art Algorithms; http://en.wikipedia.org/wiki/Decision_tree_learning.
Simplifying Decision Trees: A Survey; Leonard A. Breslow, David W. Aha; Engineering Review, vol. 12, No. 1, 1997, pp. 1-40.
Streaming Time Series Summarization Using User-Defined Amnesic Functions; Themis Palpanas, Michail Vlachos, Eamonn Keogh, Dimitrios Gunopulos; 2008.
Extended Search Report dated May 16, 2018 in European Patent Application No. 17205617.8, 5 pages.
Extended Search Report dated May 9, 2018 in European Patent Application No. 17205600.4, 8 pages.
Notice of Allowance dated Mar. 5, 2019 in U.S. Appl. No. 15/370,701, 9 pages.

* cited by examiner

PREDICTIVE ANOMALY DETECTION

CROSS-REFERENCE TO RELATED APPLICATIONS

This application is related by subject matter to U.S. patent application Ser. No. 15/370,706, entitled "Barcode Reconstruction Utilizing A Sequence Alignment Matrix," and U.S. patent application Ser. No. 15/370,701, entitled "In-Field Data Acquisition and Formatting," each of which is being filed on even date herewith and each of which is hereby incorporated by reference as if set forth in its entirety herein.

BACKGROUND

Traditionally, monitoring the quality of barcode signal readings, for instance, in laser barcode scanners and image-based vision sensors, has been limited to statistics about read quality that highlight issues only after they have occurred. Such solutions do little to prevent field device downtime or performance degradation before they actually occur in the form of a significant decrease in adequate reading rate.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In various embodiments, systems, methods, and computer-readable storage media are provided for an embedded, scalable, predictive tool capable of detecting in-field anomalies and trends in advance of productivity losses on single devices, device clusters, and/or multi-cluster architectures. In-field and in real-time, sets of barcode signal sequences associated with respective barcode symbols are collected in time series (that is, at successive time intervals). A quality index measure in computed for each of the barcode signal sequence sets such that each quality index measure is associated with a barcode symbol. Patterns among the sets are identified therefrom and compared to barcode symbol patterns that are known to be associated with particular trends and/or anomalies and appropriately classified as such.

Embodiments hereof provide for predictive, real-time identification of potential issues in barcode readers, as well as provide reassurance of reading quality for field devices that are operating as expected. Such predictive tools and methods enable advance identification of potential issues so that such issues may be addressed without significant field device downtime or reader performance degradation.

BRIEF DESCRIPTION OF THE DRAWINGS

The present invention is illustrated by way of example and not limitation in the accompanying figures in which like reference numerals indicate similar elements and in which.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Data mining consists of discovering and extracting patterns in large scale data sets. Patterns, as utilized herein, may be defined as synthetic, semantic-rich representations of a set of data that are valid on the data with a certain degree of confidence, understandable in terms of syntax and semantics, (in some instances) previously unknown, and potentially useful for a user to take action. Data mining often is utilized where traditional analysis techniques are unfit, for instance, due to huge amounts of data, data high-dimensionality, and/or data heterogeneity. To extract patterns, dedicated task-specific algorithms (e.g., heuristics and calculations) may be used. Such algorithms may include clustering, classification, summarization, regression, association rules, time series analysis, and the like.

Anomaly detection, useful to predict future issues, consists of detecting anomalous and/or surprising, previously unknown patterns that may be linked to interesting or unusual data (e.g., outliers or deviations) and may require further investigation depending on the task at hand. In a general sense, an anomalous behavior or pattern is one whose frequency of occurrences differs substantially from that expected, given previously seen data. Not all surprising patterns are necessarily anomalies but detection of such patterns nonetheless provides useful information for data analysis.

Figure 1:
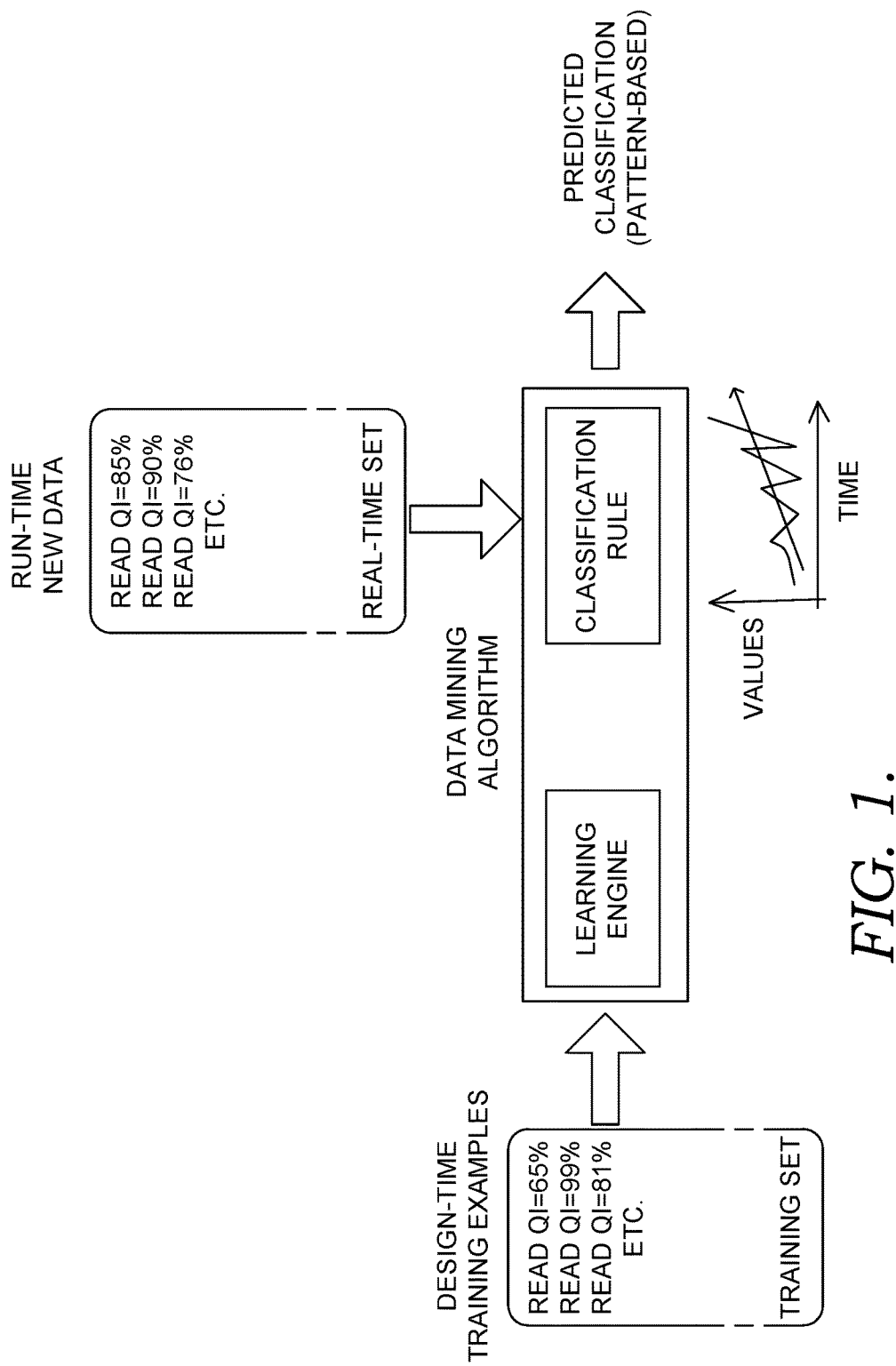
FIG. 1 is a schematic diagram illustrating the basic concept of mining data in time series, in accordance with exemplary embodiments of the present invention.

When extracting patterns using time series analysis, the goal is the detection of recurring patterns and/or atypical sequences in data over time. FIG. 1 illustrates a schematic diagram showing the basic concept of mining data in time series. Note there are two distinct phases. The first is a design-time training phase for obtaining, through the tuning of the parameters of the algorithm utilizing a sufficient number of provided measured samples, the reliable classification rules. The second phase is a run-time phase in which new data are classified by the system. (It should be noted that it is also possible to provide the possibility to update the tuning of the parameters dynamically over time (instead of statically) using the run-time samples. Normally, however, as a first choice, it is preferable to keep the two phases separate.)

Embodiments of the present invention utilize time series analysis techniques, as applied to measurement of a custom quality index measure, to detect recurring data patterns and/or anomalous data patterns in barcode readings over time. As such, various aspects of the technology described herein are generally directed to systems, methods, and computer-readable storage media for an embedded, scalable, predictive tool capable of detecting in-field anomalies and trends in advance of productivity losses on single devices, device clusters, and/or multi-cluster architectures. In-field and in real-time, sets of barcode signal sequences associated with respective barcode symbols are collected in time series (that is, at successive time intervals). A quality index measure in computed for each of the barcode signal sequence sets such that each quality index measure is associated with a barcode symbol. Patterns among the sets are identified therefrom and compared to barcode symbol patterns that are known to be associated with particular trends or anomalies and appropriately classified as such.

A custom quality index measure in accordance with embodiments of the present invention does not originate from a "verification system," as that term is utilized by one of ordinary skill in the art. Typically, verification systems consist of machine vision software with proper illumination developed to assess "barcode readability" and also take into account that marking and labeling systems degrade over time. Verification systems are more costly and accurate than a standard barcode readers at identifying low-quality barcodes. Moreover they must be compliant with published barcode quality standards (1D and 2D barcodes) such as ISO 15415, ISO 15416, and AIM DPM/ISO 29158.

Nevertheless, in some cases, depending on the requirements of a particular application or organization, needs may also be satisfied by a more simple and economic solution: a standard barcode reader equipped with a special tool capable of classifying every barcode with an arbitrary but reliable metric (i.e., a significant and repeatable measure). This kind of "custom verification," in accordance with embodiments of the present invention, at least for a particular intended application, can provide objective measurements for actual barcode ease-of-reading.

Accordingly, exemplary embodiments are directed to methods being performed by one or more computing devices including at least one processor, the methods for predicting anomalies and/or trends in barcode reading capability. An exemplary method comprises acquiring, at a field device, a plurality of sets of successive barcode signal sequences, each barcode signal sequence set of the plurality of sets being associated with a respective barcode symbol; computing, at the field device, a quality index measure for each barcode symbol; identifying, at the field device, a pattern in the quality index measures for the plurality of barcode symbols; comparing, at the field device, the identified pattern to a plurality of known barcode symbol patterns; and classifying, at the field device, the identified pattern as one of the plurality of known barcode symbol patterns or a pattern anomaly.

Other exemplary embodiments are directed to sensors for in-field prediction of anomalies and trends in barcode reading capability. An exemplary sensor comprises an embedded data acquiring component configured to acquire a plurality of sets of successive barcode signal sequences, each barcode signal sequence set of the plurality of sets being associated with a respective barcode symbol; an embedded computing component configured to compute a quality index measure for each barcode symbol; an identifying component configured to identify a pattern in the quality index measures for the plurality of barcode symbols; a comparing component configured to compare the identified pattern to a plurality of known barcode symbol patterns; and classifying component configured to classify the identified pattern as one of the plurality of known barcode symbol patterns or a pattern anomaly.

Yet other exemplary embodiments are directed to one or more computer-readable storage media storing computer-useable instructions that, when used by one or more computing devices, cause the one or more computing devices to perform a method for predicting anomalies and trends in barcode reading capability. An exemplary method comprises acquiring, at a field device, a plurality of sets of successive barcode signal sequences, each barcode signal sequence set of the plurality of sets being associated with a respective barcode symbol; acquiring, at the field device, for each successive barcode signal sequences of each of the plurality of sets, a barcode signal sequence of bar elements and space elements in alternating order; and computing, at the field device, a quality index measure for each barcode symbol by (a) for each barcode signal sequence, diagonally aligning the barcode signal sequence on a sequence alignment matrix comprised of a plurality of matrix squares (i.e., matrix entries) such that: (1) each row of matrix squares represents an element in a reconstructed portion of a barcode symbol, (2) each column of matrix squares represents an element of the barcode signal sequence, and (3) the barcode signal sequence is sequentially aligned on a plurality of diagonals of the sequence alignment matrix such that each of the plurality of diagonals represents a potential alignment of the elements of the barcode signal sequence and elements of the reconstructed portion of the barcode symbol; (b) for each barcode signal sequence, assigning a score to each matrix square that includes an element of the barcode signal sequence, the matrix square score indicating whether or not there is element alignment at that square; (c) for each barcode signal sequence, calculating a score for each of the plurality of diagonals by summing the scores for each matrix square respectively comprising each diagonal; (d) selecting a highest score from the calculated scores for each barcode signal sequence; and (e) averaging the highest score for each barcode signal sequence to compute the quality index measure. The exemplary method further comprises identifying, at the field device, a pattern in the quality index measures for the plurality of barcode symbols; comparing, at the field device, the identified pattern to a plurality of known barcode symbol patterns; and classifying the identified pattern as one of the plurality of known barcode symbol patterns or a pattern anomaly.

Embodiments of the present invention utilize a custom quality index measure, calculated for barcode readers employing Advanced Code Reconstruction (ACR) to reconstruct barcode symbols from partial signal sequences. An exemplary system and method for calculating such a custom quality index measure are set forth in U.S. patent application Ser. No. 15/370,706, entitled "Barcode Signal Reconstruction Utilizing Sequence Alignment Matrices," filed on even date herewith, and hereby incorporated by reference as if set forth in its entirety herein.

Figure 2:
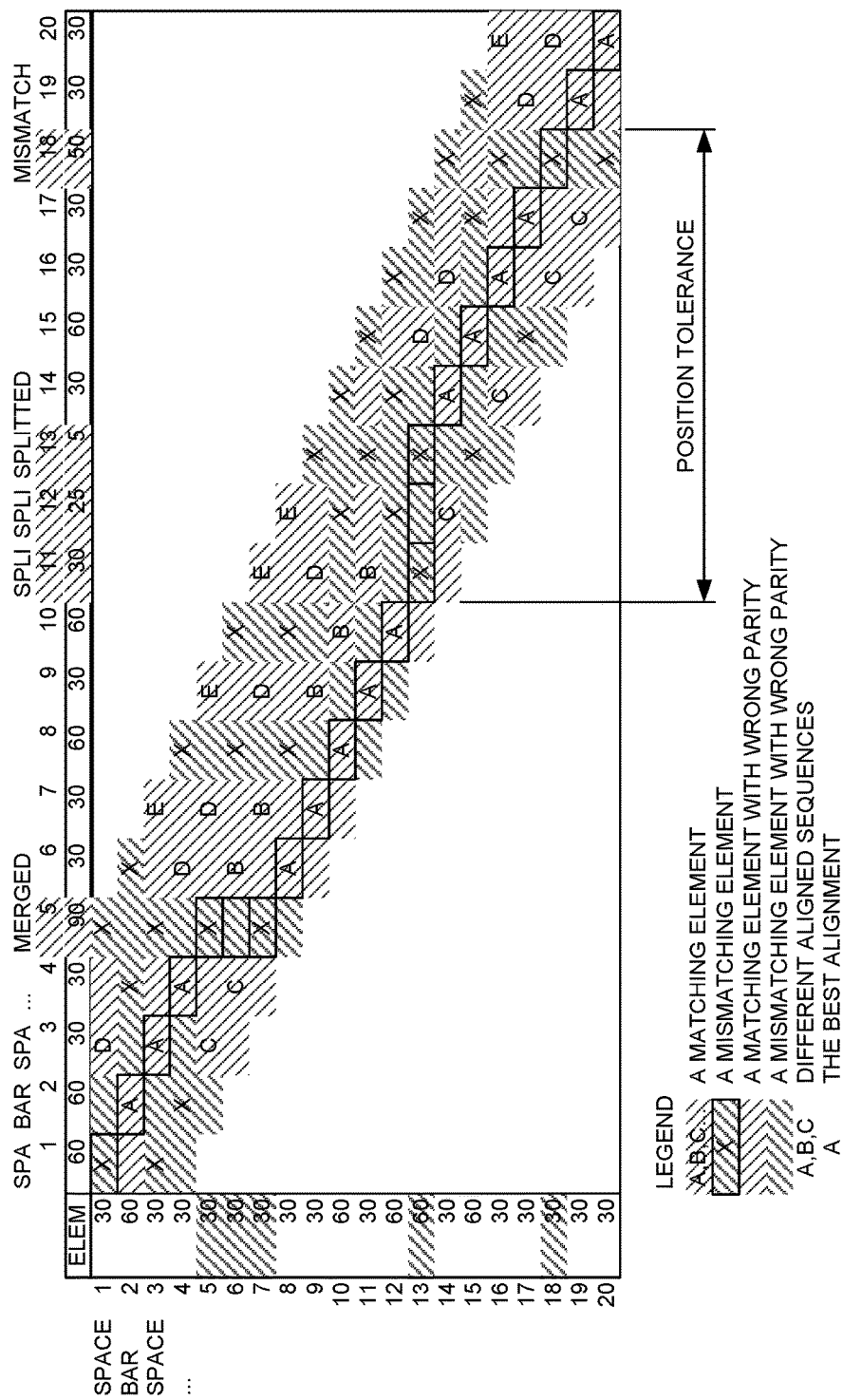
FIG. 2 is a schematic diagram illustrating alignment of a partial barcode signal sequence with an already reconstructed portion of a barcode symbol/label utilizing a Sequence Alignment Matrix (SAM), in accordance with exemplary embodiments of the present invention.

In short, and with reference to FIG. 2, illustrated is a schematic diagram showing alignment of a partial barcode signal having an already reconstructed portion of a barcode symbol/label utilizing a Sequence Alignment Matrix (SAM), in accordance with exemplary embodiments of the present invention. In the illustrated instance, merge, split and mismatch conditions are illustrated and five (5) different possible alignments, labeled A-E, are shown. The expected "best" alignment is illustrated with thick black-edge rectangles and is labeled A.

In accordance with embodiments of the present invention, each row of matrix squares represents an element (bar element or space element) in a reconstructed portion of a barcode symbol. Each column of matrix squares represents an element of a received partial barcode signal sequence. (It should be noted that the rows and columns may be oppositely aligned, such that the matrix rows represent elements of a received barcode signal sequence and columns represent elements of an already reconstructed portion of the linear barcode symbol, within the scope of embodiments hereof.) A received partial barcode signal sequence is sequentially aligned on a plurality of diagonals of the SAM such that each of the plurality of diagonals represents a potential alignment of the elements of the received partial barcode signal sequence and the elements of the reconstructed portion of the barcode symbol. Diagonals are filled alternately and bar elements and space elements cannot change their parity. In aligning utilizing a SAM, only a sub-set of diagonals needs to be filled and analyzed (within the position tolerance). A mismatch condition results in a match-break in a diagonal, a merge condition results in a short sequence of vertical non-matching elements, and a split condition results in a short sequence of horizontal non-matching elements. Subsequent to encountering a merge condition or a split condition, an alignment sequence switches from a first diagonal to a second diagonal.

In order to determine the "best" alignment utilizing a SAM in accordance with embodiments of the present invention, a scoring system is utilized wherein a matrix square score is assigned to each matrix square that includes an element of a received partial barcode signal sequence, the matrix square score indicating whether or not there is element alignment at that matrix square. For each of the plurality of diagonals, a progressive positive integer, beginning with number one (1), is assigned to each sequential matrix square having a matching element between the elements of the reconstructed portion of the barcode symbol under reconstruction and the elements of the received partial barcode signal sequence. For each of the plurality of diagonals, a value of zero (0) is assigned to each matrix square that does not have a matching element between the elements of the reconstructed portion of the barcode symbol under reconstruction and the elements of the received partial barcode signal sequence. A value of one (1) is then assigned to each matrix square that follows a matrix square having an assigned value of zero (0).

After assigning scores to each matrix square that includes an element of a received partial barcode signal sequence, a diagonal score is calculated for each of the plurality of diagonals containing element alignments. The diagonal score is calculated by summing the scores of all matrix squares comprising the diagonal. In the case of a merge condition or a split condition, the potential alignment computation is forked. That is, a first partial potential alignment score is calculated by summing the matrix square scores for a portion of the matrix squares comprising a first of the plurality of diagonals, the portion terminating upon encountering an endpoint of one of an element split subsequence or an element merge subsequence. Subsequently, alignment is switched to a second of the plurality of diagonals, the second of the plurality of diagonals including an opposing endpoint of the one of the element split subsequence or the element merge subsequence. A second partial potential alignment score is calculated for the potential alignment by summing the matrix square scores for a portion of the matrix squares comprising the second of the plurality of diagonals, the portion originating at the opposing endpoint of the one of the element split subsequence or the element merge subsequence. The first and second partial scores are summed to arrive at the potential alignment score.

Figure 3:
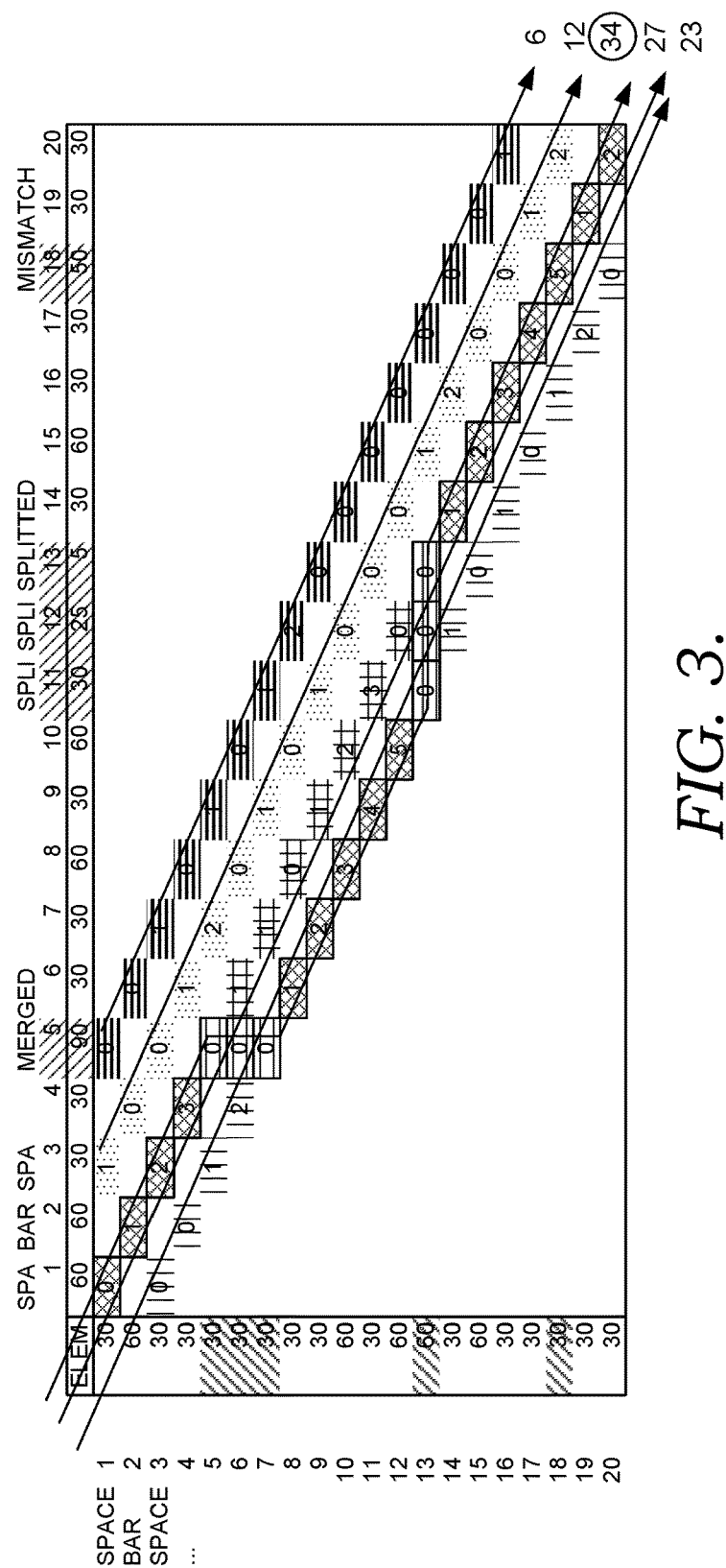
FIG. 3 is a schematic diagram illustrating diagonal and partial alignment scoring for an alignment of a partial barcode signal sequence with an already reconstructed portion of a barcode symbol/label utilizing a SAM, in accordance with exemplary embodiments of the present invention.

In accordance with embodiments of the present invention, the diagonal score or partial alignment score having the highest numerical value is selected for updating the barcode symbol under reconstruction. Unlike prior art methods, all elements (excluding non-matching elements) comprising the selected updating sequence are utilized for reconstruction. An exemplary SAM constructed utilizing the principles described herein is illustrated in FIG. 3. Note that the "best" alignment (and thus the alignment that is selected for reconstruction of the barcode symbol) comprises elements from multiple diagonals that result in a potential alignment score of 34, while the diagonal scores sum to 6, 12, 27 and 23, respectively.

In addition to being utilized to select alignments for reconstructing barcodes from partial barcode signals, a scoring metric as described herein may be utilized to provide an objective measurement of barcode quality. Moreover, a real-time computation of a barcode quality indicator, in accordance with embodiments of the present invention may aid customers in avoiding productivity losses due to barcode reader performance degradation as well as provide reassurance of reading quality for field devices that are operating as expected.

As a natural consequence of the score calculation discussed herein above, the maximum expected score in the case of N-length i-th sequence is defined by the Gauss' formula:

$$MAX(si(N))=1+2+ \ldots +N=N(N+1)/2.$$

$$MIN(si(N))=0$$

From this process, the following formula may be utilized to calculate a global score resulting from multiple partial barcode signal alignments, the global score representing a custom quality index measure, in accordance with embodiments of the present invention.

$$S = \frac{2}{K}\sum_{i=1}^{K}\frac{si}{Ni(Ni+1)} \leftarrow [0 \ldots 1]$$

The global score is calculated by averaging over K alignments, the local scores (si) and normalizing all the values between a [0 . . . 1] interval (as opposed to the superior limit of N(N+1)/2). The global score may be utilized as an intuitive, custom, percentage-based barcode quality index measure.

For laser barcode readers, for every reconstructed label, a method in accordance with embodiments of the present invention consists of collecting all the local scores resulting from partial barcode signal alignment over the total number of partial alignments (K), along with the total number of elements involved in every alignment (Ni). This local score information (si) may be retained during reconstruction in order to be utilized in computing a global score (S).

Figure 4:
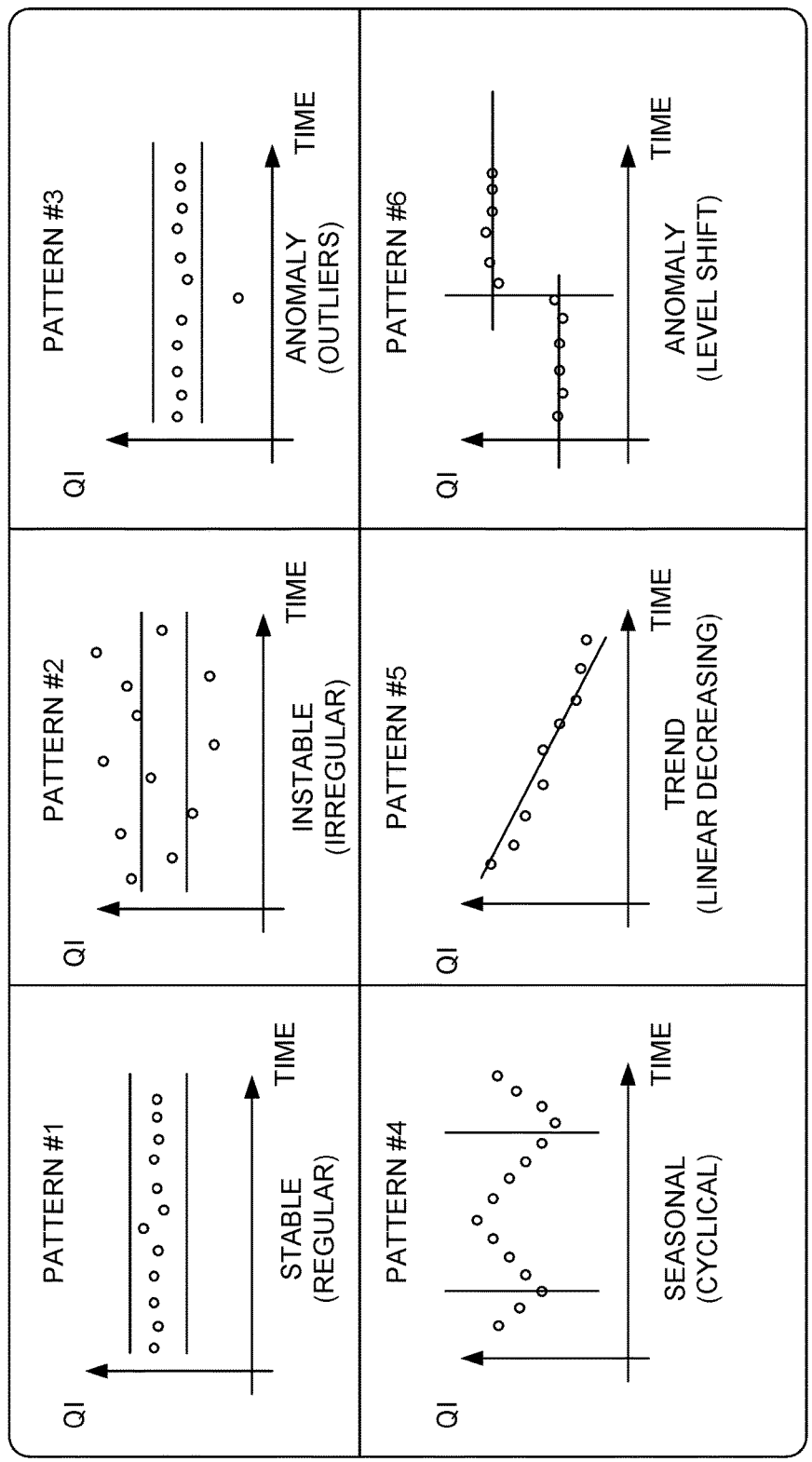
FIG. 4 is a series of schematic diagrams illustrating six potential patterns that may be discovered by custom quality index measure time series analysis, in accordance with exemplary embodiments of the present invention.

In accordance with exemplary embodiments hereof, recurring patterns and/or atypical sequences may be identified utilizing the custom quality index. In embodiments, various detected patterns may be predictors of various conditions that may be typical or atypical for a given barcode reader. With reference to FIG. 4, schematic diagrams illustrating six potential patterns that may be discovered by custom quality index measure time series analysis are shown. It will be understood and appreciated by those having ordinary skill in the art that the illustrated patterns are exemplary in nature and are not meant to limit the scope of embodiments of the present invention in any way. It will further be understood and appreciated that the time axis in each of the six pattern representations need not necessarily have the same scale from one case to another.

As shown, the pattern labeled "PATTERN #1" is illustrative of a stable or regular condition, indicating that the barcode reader resulting in barcodes with custom quality index measures having a similar pattern to that shown is operating as expected. The pattern labeled "PATTERN #2" is illustrative of an instable or irregular condition, indicating that the barcode reader resulting in barcodes with custom quality index measure having a similar pattern to that shown may be exhibiting a laser calibration warning. The pattern labeled "PATTERN #3" is illustrative of an outlier condition, indicating that the barcode reader resulting in barcodes with custom quality index measure having a similar pattern to that shown may be exhibiting an internal camera lighting trigger loss warning. The pattern labeled "PATTERN #4" is illustrative of a seasonal/cyclical condition, indicating that the barcode reader resulting in barcodes with custom quality index measure having a similar pattern to that shown may be exhibiting an unstable environmental lighting conditions warning. The pattern labeled "PATTERN #5" is illustrative of a trend (linearly decreasing) condition, indicating that the barcode reader resulting in barcodes with custom quality index measure having a similar pattern to that shown may be exhibiting a print quality degradation warning, potentially related to toner level. The pattern labeled "PATTERN #6" is illustrative of an anomaly (level shift) condition, indicating that the barcode reader resulting in barcodes with custom quality index measure having a similar pattern to that shown may be exhibiting camera autofocus warning and/or an unexpected laser change warning. Other patterns not shown indicative of other barcode reader conditions are possible within the scope of embodiments of the present invention.

In accordance with embodiments hereof, anomalous behavior is detected in time series by examining previously observed normal data and utilizing those observed patterns to build a model. Data obtained in future barcode readings then can be compared to the model and any lack of conformity may be examined as potentially signaling an anomaly.

While other classifiers may be utilized, exemplary embodiments of the present invention utilize a decision tree as the learning engine/classification algorithm. The decision tree is a predictive model that takes as input the array of values and by using a set of predicting properties defined during training sessions, outputs a classification between a known set of patterns that one may desire to recognize (e.g., the patterns shown in FIG. 4).

Figure 5:
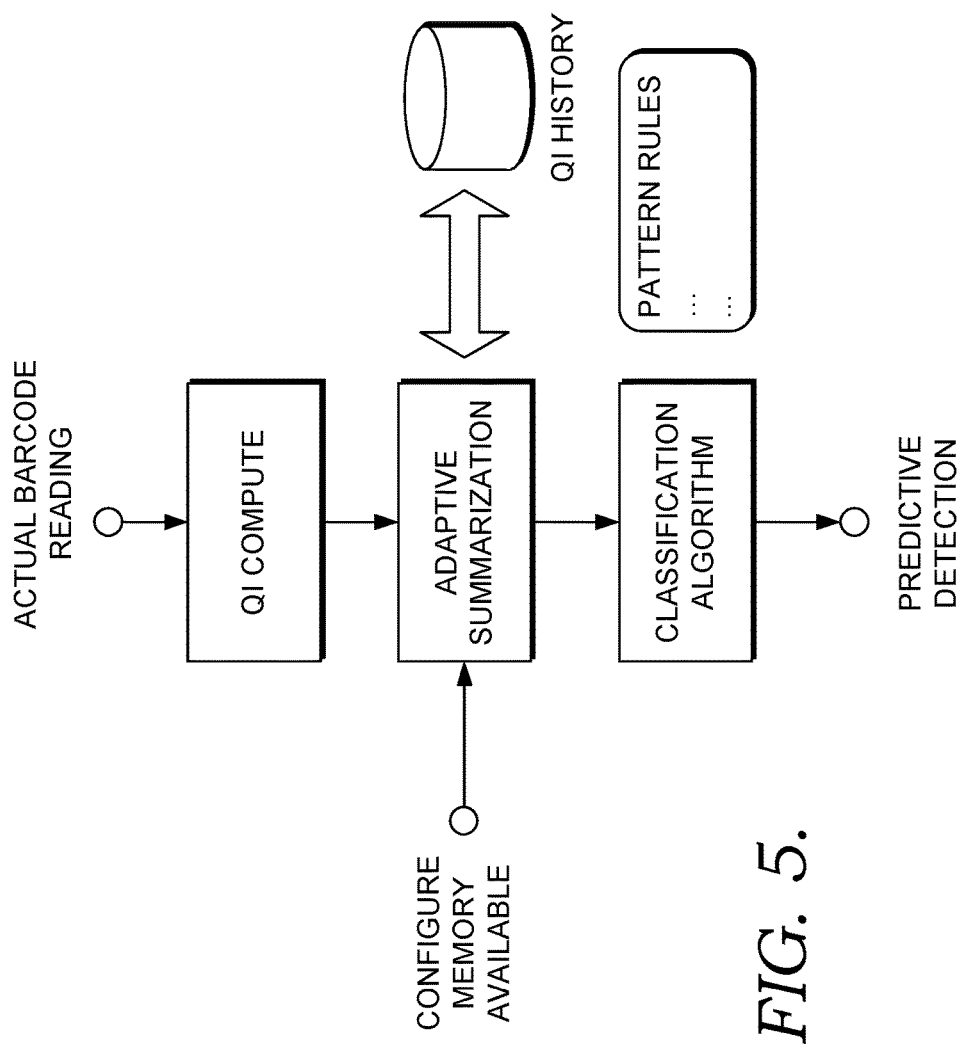
FIG. 5 is a flow diagram illustrating an exemplary three-step method for detecting typical and atypical data patterns, in accordance with embodiments of the present invention.

With reference to FIG. 5, a flow chart showing an exemplary three-step method for detecting typical and atypical data patterns is illustrated. After computing a custom quality index for a plurality of barcode symbols, an adaptive summarization may be performed, based on the actual configuration for the memory available in the data mining task. It should be noted that a throughput of 1 byte for each custom quality index measure by reading 10 labels per second equates to 36 Kbytes per hour or about 1 MB in 24 hours. If a similar amount of memory is not available, summarization (e.g., by means of averaging or other statistical techniques) may be utilized in order to approximate an extremely large data-points number with a summary which retains its essential features. The classification algorithm, given an unlabeled time series, is configured to assign it to a predefined pattern class (e.g., those illustrated in FIG. 4).

Figure 6:
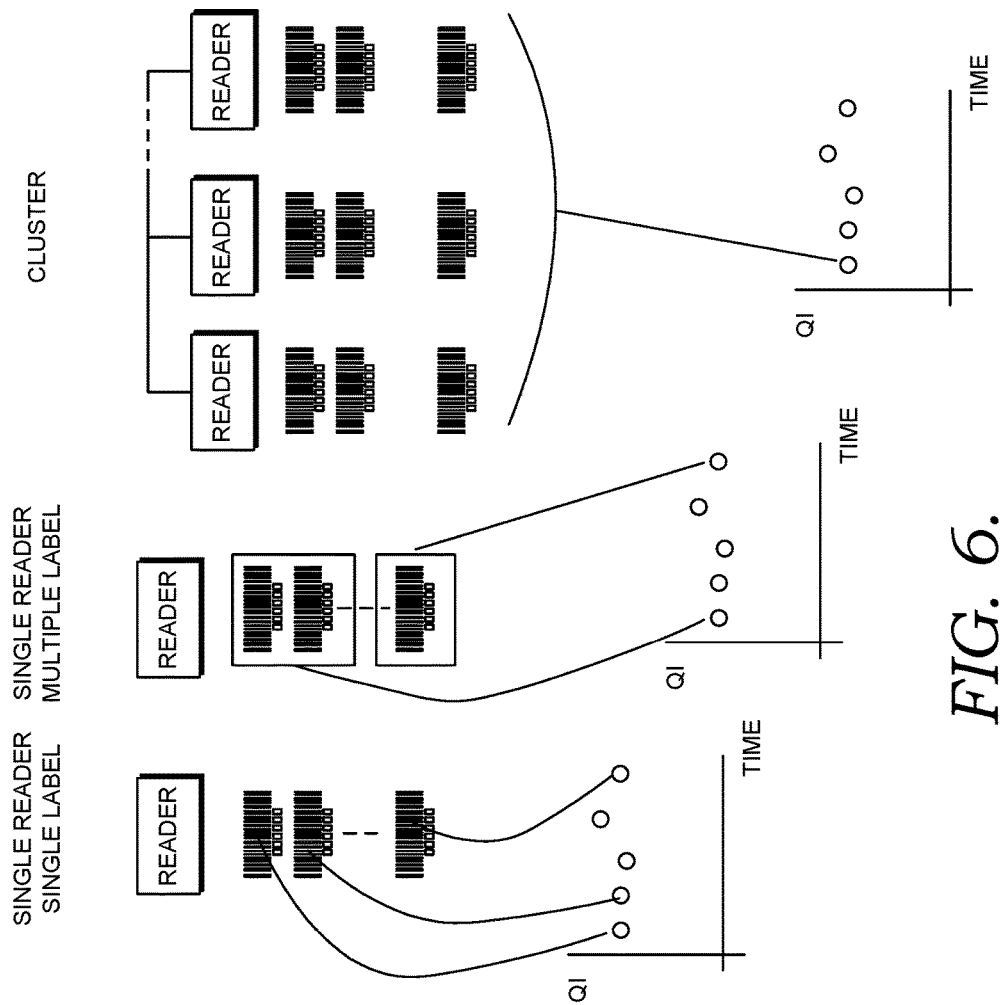
FIG. 6 is a schematic diagram illustrating the scalability of exemplary methods described herein, in accordance with exemplary embodiments of the present invention.

Since it is possible to define each point of the data set as resulting from one or more custom quality index samples, methods in accordance with embodiments of the present invention are scalable, as illustrated in the schematic diagram of FIG. 6. For a single scanner, the custom quality index measure may be associated with each sample to a single barcode reading, to all of the readings in a phase (e.g., by averaging) or to any predetermined number of readings. In a cluster, the custom quality index measure may be associated with the whole performance over multiple scanners.

Figure 7:
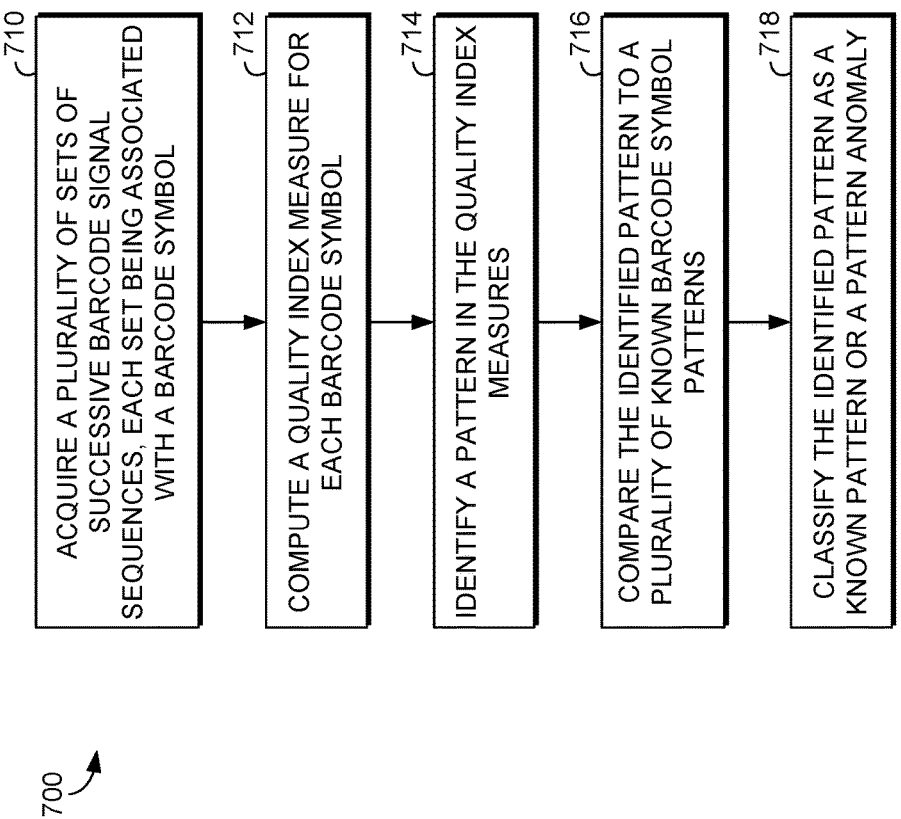
FIG. 7 is a flow diagram illustrating a method for predicting anomalies and/or trends in barcode reading capability, in accordance with exemplary embodiments of the present invention.

Turning now to FIG. 7, illustrated is a flow diagram showing an exemplary method for predicting anomalies and/or trends in barcode reading capability, in accordance with embodiments of the present invention. As indicated at block 710, at a field device, a plurality of sets of successive barcode signal sequences is received. Each barcode signal sequence set of the plurality of sets is associated with a respective barcode symbol. As indicated at block 712, at the field device, a quality index measure is computed for each barcode symbol. As indicated at block 714, at the field device, a pattern is identified in the quality index measure for the plurality of barcode symbols. The identified pattern is compared, at the field device, to a plurality of known barcode symbol patterns, as indicated at block 716. As indicated at block 718, at the field device, the identified pattern is classified as one of the plurality of known barcode symbol patterns or a pattern anomaly.

Figure 8:
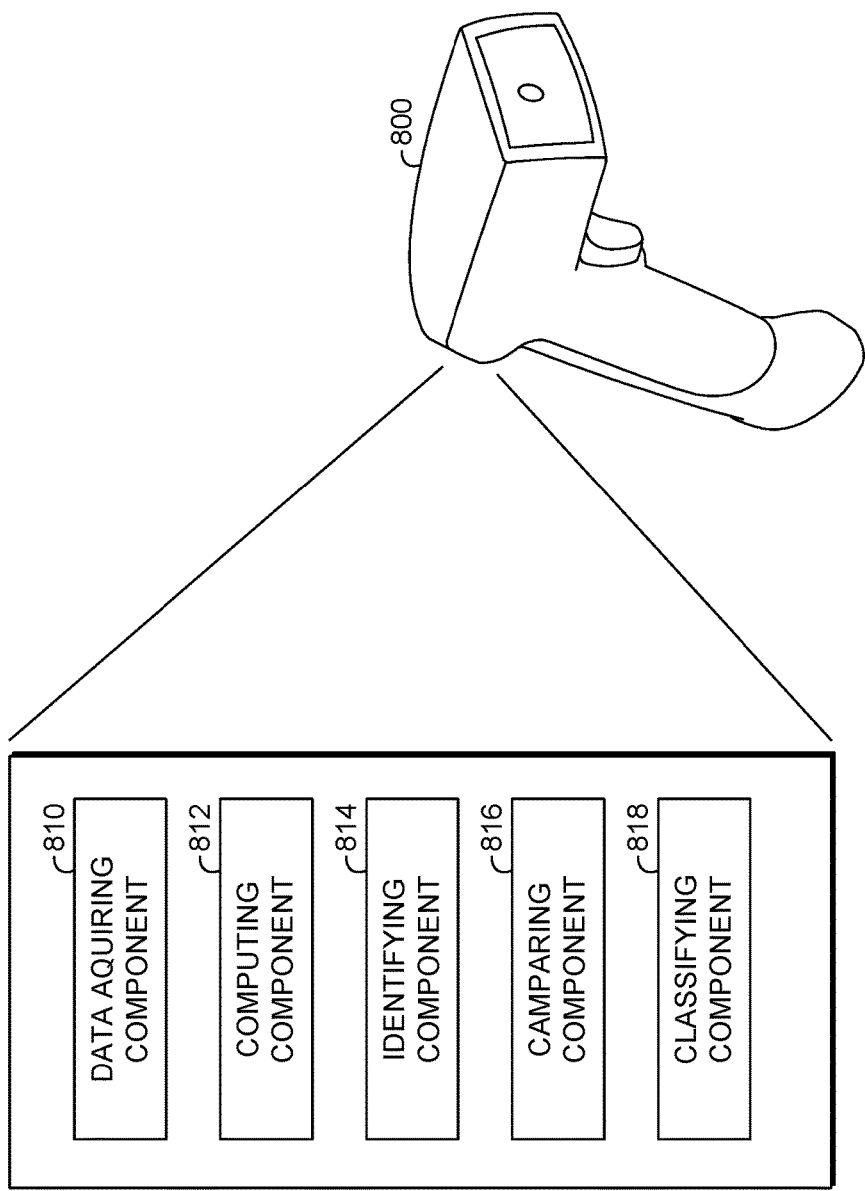
FIG. 8 is a schematic diagram illustrating an exemplary barcode reader that may be utilized in accordance with exemplary embodiments of the present invention.

With reference to FIG. 8, illustrated is a schematic diagram showing an exemplary barcode sensor/reader 800 for in-field prediction of anomalies and trends in barcode reading capability that may be utilized in accordance with exemplary embodiments of the present invention. The illustrated sensor 800 includes an embedded data acquiring component 810, an embedded computing component 812, an identifying component 814, a comparing component 816, and a classifying component 818. The embedded data acquiring component 810 is configured for acquiring a plurality of sets of successive barcode signals, each barcode signal set of the plurality of sets begin associated with a respective barcode symbol. In embodiments, the embedded data acquiring component 810 further is configured, for each successive barcode signal of each of the plurality of sets, for acquiring a barcode signal sequence of bar elements and space elements in alternating order.

The embedded computing component 812 is configured for computing a quality index measure for each barcode symbol. In embodiments, the embedded computing component 812 is configured or computing a quality index measure for each barcode symbol by: (a) for each barcode signal sequence, diagonally aligning the barcode signal sequence on a sequence alignment matrix comprised of a plurality of matrix squares such that: (1) each matrix row represents an element in a reconstructed portion of a barcode symbol, (2) each matrix column represents an element of the barcode signal sequence, and (3) the barcode signal sequence is sequentially aligned on a plurality of diagonals of the sequence alignment matrix such that each of the plurality of diagonals represents a potential alignment of the elements of the barcode signal sequence and elements of the reconstructed portion of the barcode symbol; (b) for each barcode signal sequence, assigning a score to each matrix square that includes an element of the barcode signal sequence; (c) for each barcode signal sequence, calculating a score for each of the plurality of diagonals by summing the scores for each matrix square respectively comprising each diagonal; (d) selecting a highest score from the calculated scores for each of the plurality of barcode signal sequence; and (e) averaging the highest score for each barcode signal sequence to compute the quality index measure. In embodiments, the embedded computing component 812 may further be configured for normalizing the highest score selected for each barcode signal sequence to a value between zero (0) and one (1) to compute the quality index measure.

In embodiments, the embedded computing component 812 further is configured for assigning a score to each matrix square that includes an element of the barcode signal sequence by, for each of the plurality of diagonals, assigning a progressive positive integer to each sequential matrix square having a matching element between the reconstructed portion of the barcode symbol and the barcode signal sequence. In embodiments, the embedded computing component 812 further is configured for assigning a progressive positive integer to each sequential matrix square having a matching element between the reconstructed portion of the barcode symbol and the barcode signal sequence by assigning a progressive positive integer beginning with number one (1) to each sequential matrix square having a matching element between the reconstructed portion of the barcode symbol and the barcode signal sequence. Further, in embodiments, the embedded computing component 812 further is configured for assigning a score to each matrix square that includes an element of the barcode signal sequence by, for each of the plurality of diagonals, assigning a value of zero (0) to each matrix square that does not have a matching element between the reconstructed portion of the barcode symbol and the barcode signal sequence. In still further embodiments, the embedded computing component 912 further is configured for assigning a score to each matrix square that includes an element of the barcode signal sequence by, for each of the plurality of diagonals, assigning a value of one (1) to each matrix square that follows a matrix square having a value of zero (0).

In accordance with embodiments of the present invention, the embedded computing component 812 is further configured for calculating a score for a possible alignment match that includes matrix squares from at least two of the plurality of diagonals. The possible alignment match score is calculated by: (1) calculating a first partial score for the possible alignment match by summing the scores for a portion of the matrix squares comprising a first of the plurality of diagonals, the portion terminating upon encountering an endpoint of one of an element split subsequence or an element merge subsequence; (2) switching to a second of the plurality of diagonals, the second of the plurality of diagonals including an opposing endpoint of the one of the element split subsequence or the element merge subsequence; (3) calculating a second partial score for the possible alignment match by summing the scores for a portion of the matrix squares comprising the second of the plurality of diagonals, the portion originating at the opposing endpoint of the one of the element split subsequence or the element merge subsequence; and (4) summing the first partial score and the second partial score.

The identifying component 814 of the sensor 800 is configured for identifying a pattern in the quality index measures for the plurality of barcode symbols. The comparing component 816 is configured for comparing the identified pattern to a plurality of known barcode symbol patterns. The classifying component is configured for classifying the identified pattern as one of the plurality of known barcode symbol patterns or as a pattern anomaly.

Figure 9:
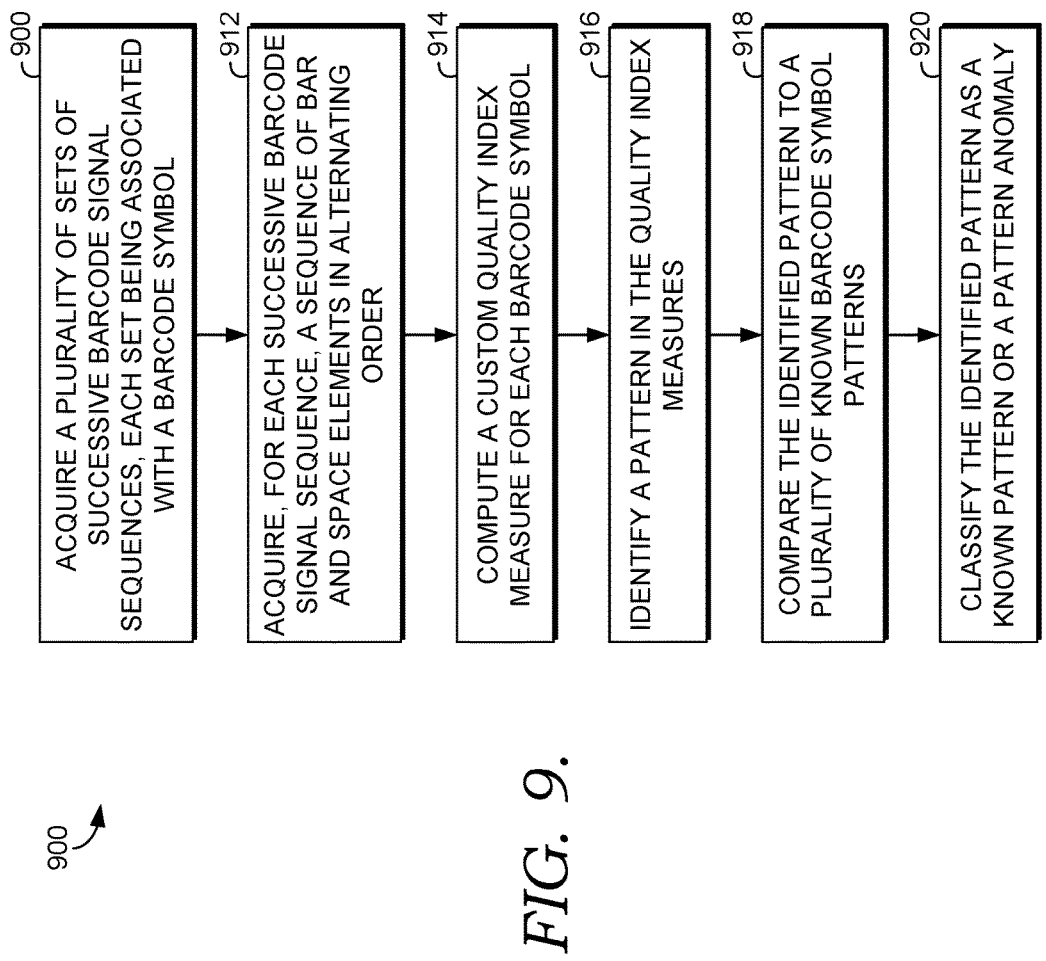
FIG. 9 is a flow diagram illustrating another exemplary method for predicting anomalies and trends in barcode reading capability, in accordance with exemplary embodiments of the present invention.

With reference to FIG. 9, illustrated is a flow diagram showing another exemplary method for predicting anomalies and trends in barcode reading capability, in accordance with exemplary embodiments of the present invention. As indicated at block 910, at a field device, a plurality of sets of successive barcode signal sequences is acquired, each barcode signal sequence set of the plurality of sets being associated with a respective barcode symbol. As indicated at block 912, at the field device, for each successive barcode signal sequence of each of the plurality of sets, a barcode signal sequence of bar elements and space elements in alternating order is acquired.

As indicated at block 914, at the field device, a quality index measure is computed for each barcode symbol by: (a) for each barcode signal sequence, diagonally aligning the barcode signal sequence on a sequence alignment matrix comprised of a plurality of matrix squares such that: (1) each row of matrix squares represents an element in a reconstructed portion of a barcode symbol, (2) each column of matrix squares represents an element of the barcode signal sequence, and (3) the barcode signal sequence is sequentially aligned on a plurality of diagonals of the sequence alignment matrix such that each of the plurality of diagonals represents a potential alignment of the elements of the barcode signal sequence and elements of the reconstructed portion of the barcode symbol; (b) for each barcode signal sequence, assigning a score to each matrix square that includes an element of the barcode signal sequence, the matrix square score indicating whether or not there is element alignment at that square; (c) for each barcode signal sequence, calculating a score for each of the plurality of diagonals by summing the scores for each matrix square respectively comprising each diagonal; (d) selecting a highest score from the calculated scores for each barcode signal sequence; and (e) averaging the highest score for each barcode signal sequence to compute the quality index measure.

As indicated at block 916, at the field device, a pattern in the quality index measures for the plurality of barcode symbols is identified. At the field device, the pattern is compared to a plurality of known barcode symbol patterns, as indicated at block 918. As indicated at block 920, at the field device, the pattern is classified as one of the plurality of known barcode symbol patterns or a pattern anomaly.

Exemplary Operating Environment

Figure 10:
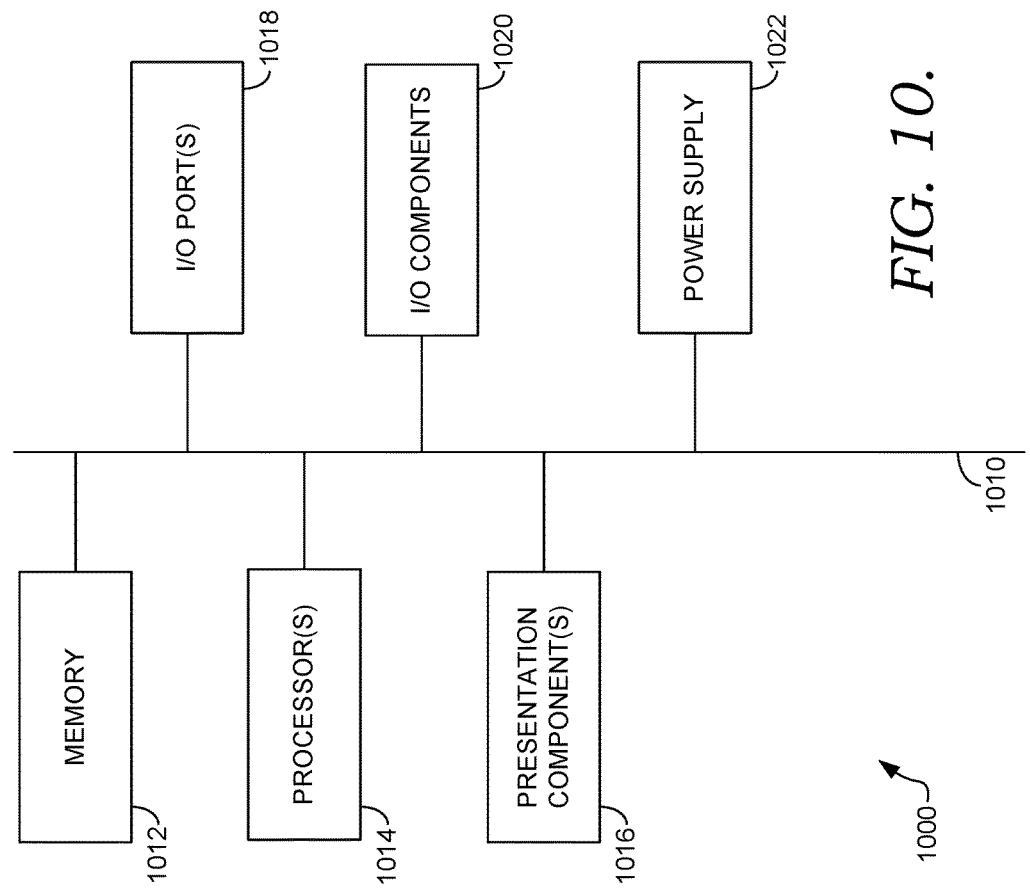
FIG. 10 is a block diagram of an exemplary computing environment suitable for use in implementing embodiments of the present invention.

Having briefly described an overview of embodiments of the present invention, an exemplary operating environment in which embodiments of the present invention may be implemented is described below in order to provide a general context for various aspects of the present invention. Referring to FIG. 10, an exemplary operating environment for implementing embodiments of the present invention is shown and designated generally as computing device 1000. The computing device 1000 is but one example of a suitable computing environment and is not intended to suggest any limitation as to the scope of use or functionality of embodiments of the invention. Neither should the computing device 1000 be interpreted as having any dependency or requirement relating to any one component nor any combination of components illustrated.

Embodiments of the invention may be described in the general context of computer code or machine-useable instructions, including computer-useable or computer-executable instructions such as program modules, being executed by a computer or other machine, such as a personal data assistant or other handheld device. Generally, program modules include routines, programs, objects, components, data structures, and the like, and/or refer to code that performs particular tasks or implements particular abstract data types. Embodiments of the invention may be practiced in a variety of system configurations, including, but not limited to, hand-held devices, unattended scanning systems (e.g., laser-based or image-based) consumer electronics, general-purpose computers, more specialty computing devices, and the like. Embodiments of the invention may also be practiced in distributed computing environments where tasks are performed by remote-processing devices that are linked through a communications network.

With continued reference to FIG. 10, the computing device 1000 includes a bus 1010 that directly or indirectly couples the following devices: a memory 1012, one or more processors 1014, one or more presentation components 1016, one or more input/output (I/O) ports 1018, one or more I/O components 1020, and an illustrative power supply 1022. The bus 1010 represents what may be one or more busses (such as an address bus, data bus, or combination thereof). Although the various blocks of FIG. 10 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art, and reiterate that the diagram of FIG. 10 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 10 and reference to "computing device."

The computing device 1000 typically includes a variety of computer-readable media. Computer-readable media may be any available media that is accessible by the computing device 1000 and includes both volatile and nonvolatile media, removable and non-removable media. Computer-readable media comprises computer storage media and communication media; computer storage media excluding signals per se. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 1000. Communication media, on the other hand, embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 1012 includes computer-storage media in the form of volatile and/or nonvolatile memory. The memory may be removable, non-removable, or a combination thereof. Exemplary hardware devices include solid-state memory, hard drives, optical-disc drives, and the like. The computing device 1000 includes one or more processors that read data from various entities such as the memory 1012 or the I/O components 1020. The presentation component(s) 1016 present data indications to a user or other device. Exemplary presentation components include a display device, speaker, printing component, vibrating component, and the like.

The I/O ports 1018 allow the computing device 1000 to be logically coupled to other devices including the I/O components 1020, some of which may be built in. Illustrative I/O components include a microphone, joystick, game pad, satellite dish, scanner, printer, wireless device, a controller, such as a stylus, a keyboard and a mouse, a natural user interface (NUI), and the like.

A NUI processes air gestures, voice, or other physiological inputs generated by a user. These inputs may be interpreted, for instance, as words or symbols appearing in programs and/or apps, and the like presented by the computing device 1000. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 1000. The computing device 100 may be equipped with depth cameras, such as, stereoscopic camera systems, infrared camera systems, RGB camera systems, and combinations of these for gesture detection and recognition. Additionally, the computing device 100 may be equipped with accelerometers or gyroscopes that enable detection of motion. The output of the accelerometers or gyroscopes may be provided to the display of the computing device 100 to render immersive augmented reality or virtual reality.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices. The computer-useable instructions form an interface to allow a computer to react according to a source of input. The instructions cooperate with other code segments to initiate a variety of tasks in response to data received in conjunction with the source of the received data.

Exemplary Features Having Multiple Dependency:

As used herein and in connection with the features listed hereinafter, the terminology "any of features" or similar variations of said terminology is intended to be interpreted such that features may be combined in any combination. For example, an exemplary feature 4 may indicate the method/ apparatus of any of features 1 through 3, which is intended to be interpreted such that elements of feature 1 and feature 4 may be combined, elements of feature 2 and feature 4 may be combined, elements of feature 3 and 4 may be combined, elements of features 1, 2, and 4 may be combined, elements of features 2, 3, and 4 may be combined, elements of features 1, 2, 3, and 4 may be combined, and/or other variations. Further, the terminology "any of features" or similar variations of said terminology is intended to include "any one of features" or other variations of such terminology, as indicated by some of the examples provided above.

Feature 1: A method being performed by one or more computing devices including at least one processor, the method for predicting anomalies and/or trends in barcode reading capability and comprising: (a) acquiring, at a field device, a plurality of sets of successive barcode signal sequences, each barcode signal sequence set of the plurality of sets being associated with a respective barcode symbol; (b) computing, at the field device, a quality index measure for each barcode symbol; (c) identifying, at the field device, a pattern in the quality index measures for the plurality of barcode symbols; (d) comparing, at the field device, the identified pattern to a plurality of known barcode symbol patterns; and (e) classifying, at the field device, the identified pattern as one of the plurality of known barcode symbol patterns or a pattern anomaly.

Feature 2: The method of feature 1, wherein acquiring the plurality of sets of successive barcode signal sequences comprises, for each successive barcode signal sequence of each of the plurality of sets, acquiring a barcode signal sequence of bar elements and space elements in alternating order.

Feature 3: The method of feature 2, wherein computing the quality index measure for each barcode symbol comprises: (a) for each barcode signal sequence, diagonally aligning the barcode signal sequence on a sequence alignment matrix comprised of a plurality of matrix squares such that: (1) each matrix row represents an element in a reconstructed portion of a barcode symbol, (2) each matrix column represents an element of the barcode signal sequence, and (3) the barcode signal sequence is sequentially aligned on a plurality of diagonals of the sequence alignment matrix such that each of the plurality of diagonals represents a potential alignment of the elements of the barcode signal sequence and elements of the reconstructed portion of the barcode symbol; (b) for each barcode signal sequence, assigning a score to each matrix square that includes an element of the barcode reading sequence; (c) for each barcode reading, calculating a score for each of the plurality of diagonals by summing the scores for each matrix square respectively comprising each diagonal; (d) selecting a highest score from the calculated scores for each barcode signal sequence; and (e) averaging the highest score for each barcode signal sequence to compute the quality index measure.

Feature 4: The method of feature 3, wherein computing the quality index measure for each barcode symbol further comprises normalizing the highest score selected for each barcode signal sequence to a value between zero (0) and one (1) to compute the quality index measure.

Feature 5: The method of any of features 3 and 4, wherein assigning a score to each matrix square that includes an element of the barcode signal sequence comprises, for each of the plurality of diagonals, assigning a progressive positive integer to each sequential matrix square having a matching element between the reconstructed portion of the barcode symbol and the barcode signal sequence.

Feature 6: The method of feature 5, wherein assigning a progressive positive integer to each sequential matrix square having a matching element between the reconstructed portion of the barcode symbol and the barcode signal sequence comprises assigning a progressive positive integer beginning with number one (1) to each sequential matrix square having a matching element between the reconstructed portion of the barcode symbol and the barcode signal sequence.

Feature 7: The method of any of features 5 and 6, wherein assigning a score to each matrix square that includes an element of the barcode signal sequence comprises, for each of the plurality of diagonals, assigning a value of zero (0) to each matrix square that does not have a matching element between the reconstructed portion of the barcode symbol and the barcode signal sequence.

Feature 8: The method of feature 7, wherein assigning a score to each matrix square that includes an element of the barcode signal sequence comprises, for each of the plurality of diagonals, assigning a value of one (1) to each matrix square that follows a matrix square having a value of zero (0).

Feature 9: The method of any of feature 1-8, wherein an element merge in the barcode signal sequence results in a subsequence of non-matching elements that are vertically aligned on the sequence alignment matrix.

Feature 10: The method of any of features 1-9, wherein an element split in the barcode signal sequence results in a subsequence of non-matching elements that are horizontally aligned on the sequence alignment matrix.

Feature 11: The method of feature 10, further comprising calculating a score for a possible alignment match that includes matrix squares from at least two of the plurality of diagonals, wherein the possible alignment match score is calculated by: (a) calculating a first partial score for the possible alignment match by summing the scores for a portion of the matrix squares comprising a first of the plurality of diagonals, the portion terminating upon encountering an endpoint of one of an element split subsequence or an element merge subsequence; (b) switching to a second of the plurality of diagonals, the second of the plurality of diagonals including an opposing endpoint of the one of the element split subsequence or the element merge subsequence; (c) calculating a second partial score for the possible alignment match by summing the scores for a portion of the matrix squares comprising the second of the plurality of diagonals, the portion originating at the opposing endpoint of the one of the element split subsequence or the element merge subsequence; and (d) summing the first partial score and the second partial score.

Feature 12: A sensor for in-field prediction of anomalies and trends in barcode reading capability, the sensor comprising: (a) an embedded data acquiring component configured to acquire a plurality of sets of successive barcode signal sequences, each barcode signal sequence set of the plurality of sets being associated with a respective barcode symbol; (b) an embedded computing component configured to compute a quality index measure for each barcode symbol; (c) an identifying component configured to identify a pattern in the quality index measures for the plurality of barcode symbols; (d) a comparing component configured to compare the identified pattern to a plurality of known barcode symbol patterns; and (e) a classifying component configured to classify the identified pattern as one of the plurality of known barcode symbol patterns or a pattern anomaly.

Feature 13: The sensor of feature 12, wherein the embedded data acquiring component further is configured to, for each successive barcode signal sequences of each of the plurality of sets, acquire a barcode signal sequence of bar elements and space elements in alternating order.

Feature 14: The sensor of any of features 12 and 13, wherein the embedded computing component is configured to compute the quality index measure for each barcode symbol by: (a) for each barcode signal sequence, diagonally aligning the barcode signal sequence on a sequence alignment matrix comprised of a plurality of matrix squares such that: (1) each matrix row represents an element in a reconstructed portion of a barcode symbol, (2) each matrix column represents an element of the barcode signal sequence, and (3) the barcode signal sequence is sequentially aligned on a plurality of diagonals of the sequence alignment matrix such that each of the plurality of diagonals represents a potential alignment of the elements of the barcode signal sequence and elements of the reconstructed portion of the barcode symbol; (b) for each barcode signal sequence, assigning a score to each matrix square that includes an element of the barcode signal sequence; (c) for each barcode signal sequence, calculating a score for each of the plurality of diagonals by summing the scores for each matrix square respectively comprising each diagonal; (d) selecting a highest score from the calculated scores for each of the plurality of barcode signal sequence; and (e) averaging the highest score for each barcode signal sequence to compute the quality index measure.

Feature 15: The sensor of feature 14, wherein the embedded computing component further is configured to normalize the highest score selected for each barcode signal sequence to a value between zero (0) and one (1) to compute the quality index measure.

Feature 16: The sensor of any of features 14 and 15, wherein the embedded computing component further is configured to assign a score to each matrix square that includes an element of the barcode signal sequence by, for each of the plurality of diagonals, assigning a progressive positive integer to each sequential matrix square having a matching element between the reconstructed portion of the barcode symbol and the barcode signal sequence.

Feature 17: The sensor of feature 16, wherein the embedded computing component further is configured to assign a progressive positive integer to each sequential matrix square having a matching element between the reconstructed portion of the barcode symbol and the barcode signal sequence by assigning a progressive positive integer beginning with number one (1) to each sequential matrix square having a matching element between the reconstructed portion of the barcode symbol and the barcode signal sequence.

Feature 18: The sensor of any of features 16 and 17, wherein the embedded computing component further is configured to assign a score to each matrix square that includes an element of the barcode signal sequence by, for each of the plurality of diagonals, assigning a value of zero (0) to each matrix square that does not have a matching element between the reconstructed portion of the barcode symbol and the barcode signal sequence.

Feature 19: The sensor of feature 18, wherein the embedded computing component further is configured to assign a score to each matrix square that includes an element of the barcode signal sequence by, for each of the plurality of diagonals, assigning a value of one (1) to each matrix square that follows a matrix square having a value of zero (0).

Feature 20: The sensor of any of features 14-19, wherein an element merge in the barcode signal sequence results in a subsequence of non-matching elements that are vertically aligned on the sequence alignment matrix.

Feature 21: The sensor of any of features 14-20, wherein an element split in the barcode signal sequence results in a subsequence of non-matching elements that are horizontally aligned on the sequence alignment matrix.

Feature 22: The sensor of feature 21, wherein the embedded computing component further is configured to calculate a score for a possible alignment match that includes matrix squares from at least two of the plurality of diagonals, wherein the possible alignment match score is calculated by: (a) calculating a first partial score for the possible alignment match by summing the scores for a portion of the matrix squares comprising a first of the plurality of diagonals, the portion terminating upon encountering an endpoint of one of an element split subsequence or an element merge subsequence; (b) switching to a second of the plurality of diagonals, the second of the plurality of diagonals including an opposing endpoint of the one of the element split subsequence or the element merge subsequence; (c) calculating a second partial score for the possible alignment match by summing the scores for a portion of the matrix squares comprising the second of the plurality of diagonals, the portion originating at the opposing endpoint of the one of the element split subsequence or the element merge subsequence; and (d) summing the first partial score and the second partial score.

Feature 23: One or more computer-readable storage media storing computer-useable instructions that, when used by one or more computing devices, cause the one or more computing devices to perform a method for predicting anomalies and trends in barcode reading capability, the method comprising: (a) acquiring, at a field device, a plurality of sets of successive barcode signals sequences, each barcode signal sequence set of the plurality of sets being associated with a respective barcode symbol; (b) acquiring, at the field device, for each successive barcode signal sequence of each of the plurality of sets, a barcode signal sequence of bar elements and space elements in alternating order; (c) computing, at the field device, a quality index measure for each barcode symbol, wherein computing the quality index measure comprises: (1) for each barcode signal sequence, diagonally aligning the barcode signal sequence on a sequence alignment matrix comprised of a plurality of matrix squares such that: each row of matrix squares represents an element in a reconstructed portion of a barcode symbol, each column of matrix squares represents an element of the barcode signal sequence, and the barcode signal sequence is sequentially aligned on a plurality of diagonals of the sequence alignment matrix such that each of the plurality of diagonals represents a potential alignment of the elements of the barcode signal sequence and elements of the reconstructed portion of the barcode symbol; (2) for each barcode signal sequence, assigning a score to each matrix square that includes an element of the barcode signal sequence, the matrix square score indicating whether or not there is element alignment at that square; (3) for each barcode signal sequence, calculating a score for each of the plurality of diagonals by summing the scores for each matrix square respectively comprising each diagonal; (4) selecting a highest score from the calculated scores for each barcode signal sequence; and (5) averaging the highest score for each barcode signal sequence to compute the quality index measure; (d) identifying, at the field device, a pattern in the quality index measures for the plurality of barcode symbols; (e) comparing, at the field device, the identified pattern to a plurality of known barcode symbol patterns; and (f) classifying the identified pattern as one of the plurality of known barcode symbol patterns or a pattern anomaly.

Feature 24: The one or more computer-readable storage media of feature 23, wherein computing the quality index measure for each barcode symbol further comprises normalizing the highest score selected for each barcode signal sequence to a value between zero (0) and one (1) to compute the quality index measure.

Feature 25: The one or more computer-readable storage media of any of features 23 and 24, wherein assigning a score to each matrix square that includes an element of the barcode signal sequence comprises, for each of the plurality of diagonals, assigning a progressive positive integer to each sequential matrix square having a matching element between the reconstructed portion of the barcode symbol and the barcode signal sequence.

Feature 26: The one or more computer-readable storage media of feature 25, wherein assigning a progressive positive integer to each sequential matrix square having a matching element between the reconstructed portion of the barcode symbol and the barcode signal sequence comprises assigning a progressive positive integer beginning with number one (1) to each sequential matrix square having a matching element between the reconstructed portion of the barcode symbol and the barcode signal sequence.

Feature 27: The one or more computer-readable storage media of any of features 25 and 26, wherein assigning a score to each matrix square that includes an element of the barcode signal sequence comprises, for each of the plurality of diagonals, assigning a value of zero (0) to each matrix square that does not have a matching element between the reconstructed portion of the barcode symbol and the barcode signal sequence.

Feature 28: The one or more computer-readable storage media of feature 27, wherein assigning a score to each matrix square that includes an element of the barcode signal sequence comprises, for each of the plurality of diagonals, assigning a value of one (1) to each matrix square that follows a matrix square having a value of zero (0).

Feature 29: The one or more computer-readable storage media of any of features 23-28, wherein an element merge in the barcode signal sequence results in a subsequence of non-matching elements that are vertically aligned on the sequence alignment matrix.

Feature 30: The one or more computer-readable storage media of feature 29, wherein an element split in the barcode signal sequence results in a subsequence of non-matching elements that are horizontally aligned on the sequence alignment matrix.

Feature 31: The one or more computer-readable storage media of feature 30, wherein the method further comprises calculating a score for a possible alignment match that includes matrix squares from at least two of the plurality of diagonals, wherein the possible alignment match score is calculated by: (a) calculating a first partial score for the possible alignment match by summing the scores for a portion of the matrix squares comprising a first of the plurality of diagonals, the portion terminating upon encountering an endpoint of one of an element split subsequence or an element merge subsequence; (b) switching to a second of the plurality of diagonals, the second of the plurality of diagonals including an opposing endpoint of the one of the element split subsequence or the element merge subsequence; (c) calculating a second partial score for the possible alignment match by summing the scores for a portion of the matrix squares comprising the second of the plurality of diagonals, the portion originating at the opposing endpoint of the one of the element split subsequence or the element merge subsequence; and (d) summing the first partial score and the second partial score.

As previously set forth, embodiments of the present invention provide systems, methods, and computer-readable storage media for an embedded, scalable, predictive tool capable of detecting in-field anomalies and trends in advance of productivity losses on single devices, device clusters, and/or multi-cluster architectures. In-field and in real-time, sets of barcode signal sequences associated with respective barcode symbols are collected in time series (that is, at successive time intervals). A quality index measure in computed for each of the barcode signal sequence sets such that each quality index measure is associated with a barcode symbol. Patterns among the sets are identified therefrom and compared to barcode symbol patterns that are known to be associated with particular trends or anomalies and appropriately classified as such.

The present invention has been described in relation to particular embodiments, which are intended in all respects to be illustrative rather than restrictive. Alternative embodiments will become apparent to those of ordinary skill in the art to which the present invention pertains without departing from its scope. While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method being performed by one or more computing devices including at least one processor, the method for predicting anomalies and/or trends in barcode reading capability and comprising:

acquiring, at a field device, a plurality of sets of successive barcode signal sequences by, for each successive barcode signal sequence of each of the plurality of sets, acquiring a barcode signal sequence of bar elements and space elements in alternating order, wherein each barcode signal sequence set of the plurality of sets is associated with a respective barcode symbol;

computing, at the field device, a quality index measure for each barcode symbol by:

(a) for each barcode signal sequence, diagonally aligning the barcode signal sequence on a sequence alignment matrix comprised of a plurality of matrix squares such that:

each matrix row represents an element in a reconstructed portion of a barcode symbol, each matrix column represents an element of the barcode signal sequence, and the barcode signal sequence is sequentially aligned on a plurality of diagonals of the sequence alignment matrix such that each of the plurality of diagonals represents a potential alignment of the elements of the barcode signal sequence and elements of the reconstructed portion of the barcode symbol;

(b) for each barcode signal sequence, assigning a score to each matrix square that includes an element of the barcode reading sequence;

(c) for each barcode reading, calculating a score for each of the plurality of diagonals by summing the scores for each matrix square respectively comprising each diagonal;

(d) selecting a highest score from the calculated scores for each barcode signal sequence; and (e) averaging the highest score for each barcode signal sequence to compute the quality index measure;

identifying, at the field device, a pattern in the quality index measures for the plurality of barcode symbols;

comparing, at the field device, the identified pattern to a plurality of known barcode symbol patterns; and classifying, at the field device, the identified pattern as one of the plurality of known barcode symbol patterns or a pattern anomaly.

2. The method of claim 1, wherein computing the quality index measure for each barcode symbol further comprises normalizing the highest score selected for each barcode signal sequence to a value between zero (0) and one (1) to compute the quality index measure.

3. The method of claim 1, wherein assigning a score to each matrix square that includes an element of the barcode signal sequence comprises, for each of the plurality of diagonals, assigning a progressive positive integer to each sequential matrix square having a matching element between the reconstructed portion of the barcode symbol and the barcode signal sequence.

4. The method of claim 3, wherein assigning a progressive positive integer to each sequential matrix square having a matching element between the reconstructed portion of the barcode symbol and the barcode signal sequence comprises assigning a progressive positive integer beginning with number one (1) to each sequential matrix square having a matching element between the reconstructed portion of the barcode symbol and the barcode signal sequence.

5. The method of claim 3, wherein assigning a score to each matrix square that includes an element of the barcode signal sequence comprises, for each of the plurality of diagonals, assigning a value of zero (0) to each matrix square that does not have a matching element between the reconstructed portion of the barcode symbol and the barcode signal sequence.

6. The method of claim 5, wherein assigning a score to each matrix square that includes an element of the barcode signal sequence comprises, for each of the plurality of diagonals, assigning a value of one (1) to each matrix square that follows a matrix square having a value of zero (0).

7. The method of claim 1, wherein an element merge in the barcode signal sequence results in a subsequence of non-matching elements that are vertically aligned on the sequence alignment matrix.

8. The method of claim 7, wherein an element split in the barcode signal sequence results in a subsequence of non-matching elements that are horizontally aligned on the sequence alignment matrix.

9. The method of claim 8, further comprising calculating a score for a possible alignment match that includes matrix squares from at least two of the plurality of diagonals, wherein the possible alignment match score is calculated by:

calculating a first partial score for the possible alignment match by summing the scores for a portion of the matrix squares comprising a first of the plurality of diagonals, the portion terminating upon encountering an endpoint of one of an element split subsequence or an element merge subsequence;

switching to a second of the plurality of diagonals, the second of the plurality of diagonals including an opposing endpoint of the one of the element split subsequence or the element merge subsequence;

calculating a second partial score for the possible alignment match by summing the scores for a portion of the matrix squares comprising the second of the plurality of diagonals, the portion originating at the opposing endpoint of the one of the element split subsequence or the element merge subsequence; and summing the first partial score and the second partial score.

10. A sensor for in-field prediction of anomalies and trends in barcode reading capability, the sensor comprising:

an embedded data acquiring component configured to acquire a plurality of sets of successive barcode signal sequences and, for each successive barcode signal sequence of each of the plurality of sets, acquire a barcode signal sequence of bar elements and space elements in alternating order, each barcode signal sequence set of the plurality of sets being associated with a respective barcode symbol;

an embedded computing component configured to compute a quality index measure for each barcode symbol by:

(a) for each barcode signal sequence, diagonally aligning the barcode signal sequence on a sequence alignment matrix comprised of a plurality of matrix squares such that:

each matrix row represents an element in a reconstructed portion of a barcode symbol, each matrix column represents an element of the barcode signal sequence, and the barcode signal sequence is sequentially aligned on a plurality of diagonals of the sequence alignment matrix such that each of the plurality of diagonals represents a potential alignment of the elements of the barcode signal sequence and elements of the reconstructed portion of the barcode symbol;

(b) for each barcode signal sequence, assigning a score to each matrix square that includes an element of the barcode signal sequence;

(c) for each barcode signal sequence, calculating a score for each of the plurality of diagonals by summing the scores for each matrix square respectively comprising each diagonal;

(d) selecting a highest score from the calculated scores for each of the plurality of barcode signal sequence; and (e) averaging the highest score for each barcode signal sequence to compute the quality index measure;

an identifying component configured to identify a pattern in the quality index measures for the plurality of barcode symbols;

a comparing component configured to compare the identified pattern to a plurality of known barcode symbol patterns; and a classifying component configured to classify the identified pattern as one of the plurality of known barcode symbol patterns or a pattern anomaly.

11. The sensor of claim 10, wherein the embedded computing component further is configured to normalize the highest score selected for each barcode signal sequence to a value between zero (0) and one (1) to compute the quality index measure.

12. The sensor of claim 10, wherein the embedded computing component further is configured to assign a score to each matrix square that includes an element of the barcode signal sequence by, for each of the plurality of diagonals, assigning a progressive positive integer to each sequential matrix square having a matching element between the reconstructed portion of the barcode symbol and the barcode signal sequence.

13. The sensor of claim 12, wherein the embedded computing component further is configured to assign a progressive positive integer to each sequential matrix square having a matching element between the reconstructed portion of the barcode symbol and the barcode signal sequence by assigning a progressive positive integer beginning with number one (1) to each sequential matrix square having a matching element between the reconstructed portion of the barcode symbol and the barcode signal sequence.

14. The sensor of claim 12, wherein the embedded computing component further is configured to assign a score to each matrix square that includes an element of the barcode signal sequence by, for each of the plurality of diagonals, assigning a value of zero (0) to each matrix square that does not have a matching element between the reconstructed portion of the barcode symbol and the barcode signal sequence.

15. The sensor of claim 14, wherein the embedded computing component further is configured to assign a score to each matrix square that includes an element of the barcode signal sequence by, for each of the plurality of diagonals, assigning a value of one (1) to each matrix square that follows a matrix square having a value of zero (0).

16. The sensor of claim 10, wherein an element merge in the barcode signal sequence results in a subsequence of non-matching elements that are vertically aligned on the sequence alignment matrix.

17. The sensor of claim 10, wherein an element split in the barcode signal sequence results in a subsequence of non-matching elements that are horizontally aligned on the sequence alignment matrix.

18. The sensor of claim 17, wherein the embedded computing component further is configured to calculate a score for a possible alignment match that includes matrix squares from at least two of the plurality of diagonals, wherein the possible alignment match score is calculated by:
    calculating a first partial score for the possible alignment match by summing the scores for a portion of the matrix squares comprising a first of the plurality of diagonals, the portion terminating upon encountering an endpoint of one of an element split subsequence or an element merge subsequence;
    switching to a second of the plurality of diagonals, the second of the plurality of diagonals including an opposing endpoint of the one of the element split subsequence or the element merge subsequence;
    calculating a second partial score for the possible alignment match by summing the scores for a portion of the matrix squares comprising the second of the plurality of diagonals, the portion originating at the opposing endpoint of the one of the element split subsequence or the element merge subsequence; and
    summing the first partial score and the second partial score.

19. One or more computer-readable storage media storing computer-useable instructions that, when used by one or more computing devices, cause the one or more computing devices to perform a method for predicting anomalies and trends in barcode reading capability, the method comprising:
    acquiring, at a field device, a plurality of sets of successive barcode signal sequences, each barcode signal sequence set of the plurality of sets being associated with a respective barcode symbol;
    acquiring, at the field device, for each successive barcode signal sequence of each of the plurality of sets, a barcode signal sequence of bar elements and space elements in alternating order;
    computing, at the field device, a quality index measure for each barcode symbol, wherein computing the quality index measure comprises:
        (a) for each barcode signal sequence, diagonally aligning the barcode signal sequence on a sequence alignment matrix comprised of a plurality of matrix squares such that:
            each row of matrix squares represents an element in a reconstructed portion of a barcode symbol,
            each column of matrix squares represents an element of the barcode signal sequence, and
            the barcode signal sequence is sequentially aligned on a plurality of diagonals of the sequence alignment matrix such that each of the plurality of diagonals represents a potential alignment of the elements of the barcode signal sequence and elements of the reconstructed portion of the barcode symbol;
        (b) for each barcode signal sequence, assigning a score to each matrix square that includes an element of the barcode signal sequence, the matrix square score indicating whether or not there is element alignment at that square;
        (c) for each barcode signal sequence, calculating a score for each of the plurality of diagonals by summing the scores for each matrix square respectively comprising each diagonal;
        (d) selecting a highest score from the calculated scores for each barcode signal sequence; and
        (e) averaging the highest score for each barcode signal sequence to compute the quality index measure;
    identifying, at the field device, a pattern in the quality index measures for the plurality of barcode symbols;
    comparing, at the field device, the identified pattern to a plurality of known barcode symbol patterns; and
    classifying the identified pattern as one of the plurality of known barcode symbol patterns or a pattern anomaly.

20. The one or more computer-readable storage media of claim 19, wherein computing the quality index measure for each barcode symbol further comprises normalizing the highest score selected for each barcode signal sequence to a value between zero (0) and one (1) to compute the quality index measure.

21. The one or more computer-readable storage media of claim 19, wherein assigning a score to each matrix square that includes an element of the barcode signal sequence comprises, for each of the plurality of diagonals, assigning a progressive positive integer to each sequential matrix square having a matching element between the reconstructed portion of the barcode symbol and the barcode signal sequence.

22. The one or more computer-readable storage media of claim 21, wherein assigning a progressive positive integer to each sequential matrix square having a matching element between the reconstructed portion of the barcode symbol and the barcode signal sequence comprises assigning a progressive positive integer beginning with number one (1) to each sequential matrix square having a matching element between the reconstructed portion of the barcode symbol and the barcode signal sequence.

23. The one or more computer-readable storage media of claim 21, wherein assigning a score to each matrix square that includes an element of the barcode signal sequence comprises, for each of the plurality of diagonals, assigning a value of zero (0) to each matrix square that does not have a matching element between the reconstructed portion of the barcode symbol and the barcode signal sequence.

24. The one or more computer-readable storage media of claim 23, wherein assigning a score to each matrix square that includes an element of the barcode signal sequence comprises, for each of the plurality of diagonals, assigning a value of one (1) to each matrix square that follows a matrix square having a value of zero (0).

25. The one or more computer-readable storage media of claim 19, wherein an element merge in the barcode signal sequence results in a subsequence of non-matching elements that are vertically aligned on the sequence alignment matrix.

26. The one or more computer-readable storage media of claim 25, wherein an element split in the barcode signal sequence results in a subsequence of non-matching elements that are horizontally aligned on the sequence alignment matrix.

27. The one or more computer-readable storage media of claim 26, wherein the method further comprises calculating a score for a possible alignment match that includes matrix squares from at least two of the plurality of diagonals, wherein the possible alignment match score is calculated by:
   calculating a first partial score for the possible alignment match by summing the scores for a portion of the matrix squares comprising a first of the plurality of diagonals, the portion terminating upon encountering an endpoint of one of an element split subsequence or an element merge subsequence;
   switching to a second of the plurality of diagonals, the second of the plurality of diagonals including an opposing endpoint of the one of the element split subsequence or the element merge subsequence;
   calculating a second partial score for the possible alignment match by summing the scores for a portion of the matrix squares comprising the second of the plurality of diagonals, the portion originating at the opposing endpoint of the one of the element split subsequence or the element merge subsequence; and
   summing the first partial score and the second partial score.

* * * * *